United States Patent Office 3,211,767
Patented Oct. 12, 1965

3,211,767
ALIPHATIC MONO ESTERS OF 2,2',4-TRIHYDROXY-4'-ALKOXYBENZOPHENONE
Albert F. Strobel, Delmar, and Sigmund C. Catino, Castleton, N.Y., assignors to General Aniline & Film Corporation, New York, N.Y., a corporation of Delaware
No Drawing. Filed Sept. 28, 1961, Ser. No. 141,282
6 Claims. (Cl. 260—410.5)

This invention relates to a new and novel class of aliphatic monoesters of 2,2',4-trihydroxy-4'-alkoxybenzophenones having excellent ultraviolet absorbing properties and good solubility characteristics in organic solvents, drying oil compositions and plastics containing the same resin systems, and in polyalkylenes.

It is known that various mono-, di-, tri- and tetrahydroxybenzophenone compounds have been utilized as ultraviolet absorbing compounds and applied to various organic substances which tend to deteriorate by the absorption of ultraviolet light. It is also know that 2,2',4 - trihydroxy-4'-alkoxybenzophenones are compatible with various types of substantially colorless film forming plastics, resins, gums, waxes and the like to yield ultraviolet absorbing compositions. The difficulty with the latter benzophenones is that although the solubility in the film forming plastics, resins, etc., may be initially satisfactory, they have the tendency to crystallize or bloom out of these materials within a short period of time. In substantially colorless film forming plastics such as polyvinyl chloride, the latter benzophenones have the tendency to yellow the polymeric film within a very short period of time.

We have discovered that when the hydroxy group in the 4-position of a 2,2',4-trihydroxy-4'-alkoxybenzophenone is esterified with an aliphatic monocarboxylic acid chloride of from 10 to 26 carbon atoms, an aliphatic monoester is produced which is not only compatible with various film forming plastics and resins employing organic solvent media, but also soluble in many organic solvents, drying oils and compositions thereof and readily dispersable in aqueous dye solutions for dyeing synthetic fibers.

These aliphatic monoesters are characterized by the following general formula:

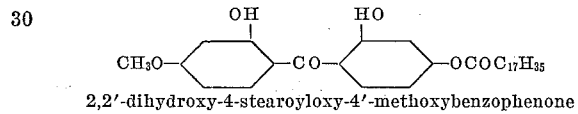

wherein R represents an alkyl radical of from 1 to 4 carbon atoms and R' represents an aliphatic radical of from 10 to 26 carbon atoms. The aliphatic radical may be saturated, branched by alkyl groups, unsaturated, i.e., olefinic or acetylenic, and may contain halogen atoms such as chlorine or bromine.

The foregoing aliphatic monoesters are readily prepared by esterifying 1 mole of a 2,2',4-trihydroxy-4'-alkoxybenzophenone in the presence of dry picoline with 1 mole of an acid chloride of from 10 to 26 carbon atoms added dropwise while maintaining a temperature below 60° C. When the esterification reaction is complete, usually within 1 hour or 1½ hours, it is drowned with water at a temperature of 10° to 15° C. and made acid with any conventional mineral acid, the aqueous layers decanted at about 5° C. and the remaining oil reslurried in water and the pH adjusted to Congo acidity with hydrochloric acid. The resulting oil is then dissolved in benzene, Nuchared and filtered. The benzene is evaporated and the resulting material reslurried in a high boiling petroleum ether, filtered free of insoluble residue and the filtrate evaporated to dryness.

The 2,2',4-trihydroxy-4'-alkoxybenzophenones utilized in the foregoing esterificaton reaction are those disclosed in the Wynn and Hoch Patent 2,686,812 and incorporated herein by reference thereto.

As previously noted, any saturated or unsaturated monocarboxylic acid chloride may be employed in the esterification reaction. For the purpose of the present invention the use of the chlorides of the following monocarboxylic acids give esters which possess the desirable solubility and compatability characteristics:

| | |
|---|---|
| capric | nonadecylic |
| n-methylnonylic | arachidic |
| isoamylisopropylacetic | tetracosanic |
| undecylic acid | d-citronellic |
| lauric | oleic |
| licoric | t-undecylenic |
| diisoamylacetic | elaidic |
| tridecylic | erucic |
| myristic | brassidic |
| pentadecylic | stearolic |
| palmitic | linolic |
| margaric | behenolic |
| stearic | |

The following examples will illustrate the preparation of the foregoing esters and their application to plastics, fabrics and drying oil compositions:

*Example 1*

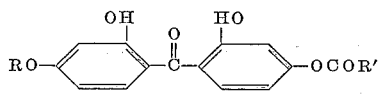

2,2'-dihydroxy-4-stearoyloxy-4'-methoxybenzophenone

Into a 500 ml. flask, fitted with stirrer, reflux condenser, dropping funnel and heating mantle is charged 52.8 grams of 2,2',4 - trihydroxy - 4' - methoxybenzophenone and 170 grams of dry picoline. At room temperature is added dropwise 49.5 grams of stearoyl chloride (0.163 mol.), keeping the temperature below 60° C. The material is held at 60° C. for one hour and then drowned into 500 ml. of water at 10–15° C. and made acid to Congo paper with 102 ml. of 38% hydrochloric acid. The water layer is decanted at 5° C. The oil is reslurried in 500 ml. of water, and the pH adjusted to Congo acidity with hydrochloric acid. The oil is dissolved in 350 ml. of benzene, Nuchared and filtered. The benzene is evaporated. The material is reslurried in 1 liter of high boiling petroleum ether, filtered free of insoluble residue and the filtrate evaporated to dryness to yield the ultraviolet absorbing compound.

The foregoing ester, as well as those prepared by the following examples, are unusually applicable to polyalkylene plastics such as, for example, polyethylene, polypropylene, and polybutylene. The amount of ester that may be employed in these polyalkylene plastics may range from 0.1% to 2% by weight of the plastic.

Application of the foregoing ester in polyethylene was carried out as follows: 99.75 parts by weight of polyethylene pellets and 0.25% by weight of the above absorbing compound were mixed on 2-roller mill at 140° C. for ten passes. The uniform mixture was then removed and pressed out into a disc on a Carver press heated to 130° C. Fadeometer exposure of the polyethylene containing this compound was made vs. a polyethylene sample without the ultraviolet absorber. After 500 hours the sample free from absorber develops a relatively higher percentage of carbonyl content (by infrared absorption) than the sample which contains the absorber. This increase in carbonyl content as measured by infrared is a means of measuring the degradation of the plastic by ultraviolet light.

Example 2

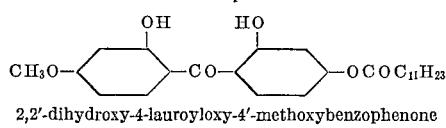

2,2'-dihydroxy-4-lauroyloxy-4'-methoxybenzophenone

This compound was prepared in the same manner as the compound of Example 1 with the exception that the stearoyl chloride was replaced by 37 grams of lauroyl chloride.

The product, when incorporated in polyethylene in the manner of Example 1, resulted in a polyethylene film which was considerably more stable with an untreated film used as a control.

Example 3

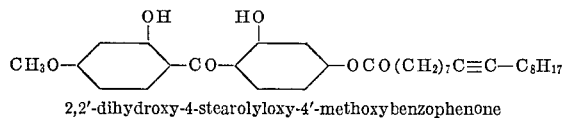

2,2'-dihydroxy-4-stearolyloxy-4'-methoxybenzophenone

Example 1 was repeated with the exception that 49.5 grams of stearolyl chloride were replaced by 49 grams of stearoyl chloride.

The resulting product, when incorporated in polyethylene in the manner of Example 1, gave a polyethylene film which was considerably more stable than the non-treated film used as a control.

Example 4

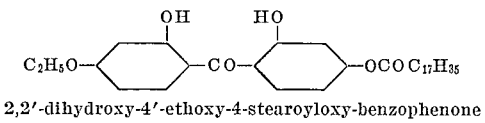

2,2'-dihydroxy-4'-ethoxy-4-stearoyloxy-benzophenone

Example 1 was repeated with the exception that 52.8 grams of 2,2',4 - trihydroxy - 4' - methoxybenzophenone were replaced by 44 grams of 2,2' - 4 - trihydroxy - 4'- ethoxybenzophenone.

The final product, when incorporated in polyethylene in the manner of Example 1, gave a film which was more considerably stable than an untreated film employed as a control.

Example 5

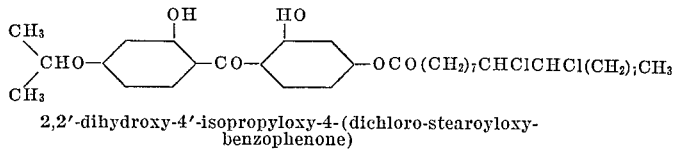

2,2'-dihydroxy-4'-isopropyloxy-4-(dichloro-stearoyloxy-benzophenone)

Example 1 was again repeated with the exception that 52.8 grams of 2,2',4 - trihydroxy - 4' - methoxybenzophenone were replaced by 47 grams of 2,2',4-trihydroxy-4'-isopropylbenzophenone and the 49.5 grams of stearoyl chloride were replaced by 61 grams of dichloro-oleoyl chloride.

The final product, when incorporated in polyethylene in the manner of Example 1, gave a film which was more considerably stable than an untreated film employed as a control.

Example 6

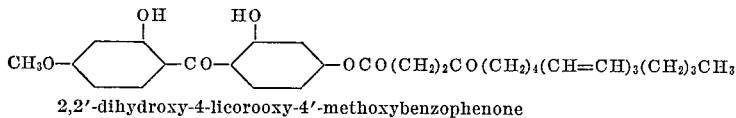

2,2'-dihydroxy-4-licorooxy-4'-methoxybenzophenone

Example 1 was again repeated with the exception that 49.5 grams of stearoyl chloride were replaced by 51 grams of licoric acid chloride.

Incorporation of the product in polypropylene is carried out in the manner of Example 1, except that 0.5% of the compound is employed. The resulting film is considerably more stable than a corresponding untreated film.

Example 7

The product of Example 1 was applied to nylon colored with Celliton Blue FFRN (C.I. 61505) in the following manner:

0.25 gram of Celliton Blue FFRN were dissolved in 100 cc. of water and 0.25 gram of the compound of Example 1 was added to the aqueous solution to form a dispersion thereof. A 10 g. piece of nylon fabric was dyed with the resulting dye preparation at 170° F. for one hour with agitation. The cloth was removed, rinsed and dried. After twenty hours exposure in a standard fadeometer, the fabric which was dyed in the presence of the ultraviolet agent showed better light fastness than a similar dyeing made without the ultraviolet agent.

Example 8

The product of Example 1 was applied to Dacron in the following manner:

0.25 gram of Genacryl Blue 6G (C.I. 42025) were dissolved in 100 cc. of water and 0.25 gram of the compound of Example 1 were dispersed in the aqueous dye solution. A 10 g. piece of Dacron 64 fabric was dyed with the resulting dye preparation for one hour at 190–200° F., after which the cloth was removed, rinsed, and dried. After twenty hours exposure in a standard fadeometer, the fastness of this dyeing was noticeably better than a similar dyeing made without the ultraviolet agent.

Example 9

The product of Example 1 was applied to a soya bean-alkyd paint in the following manner:

1.0 g. of the compound of Example 1 was added to 100 g. of a commercial brand of soya bean-alkyd paint and mixed until homogeneous. The paint was applied to a clay-coated paper with a Bird film applicator and the film dried at 70° C. Exposure of this film in a fadeometer resulted in a film which had more gloss retention and better light fastness than in the case of a film prepared in similar manner without the ultraviolet agent.

The foregoing example clearly illustrates the unusual oil solubility of the esters prepared in accordance with the present invention.

Example 10

The product of Example 1 was applied to a polyvinyl chloride plastic in the following manner:

A polyvinyl chloride formulation was prepared consisting of 100 parts of Monsanto's Opalon 300 (PVC), 25 parts of Santicizer 160 (a commercially available plasticizer) and 25 parts of dioctyl phthalate.

1 part of the absorber of Example 1 was incorporated in 100 parts of the polyvinyl chloride formulation by milling. This ester gave less yellow color to the formulation than when an equal amount of 2,2'-dihydroxy-4,4'-dimethoxybenzophenone was employed. The agent also imparted a high degree of stability to the plastic when exposed 300 hours in a fadeometer in contrast to a similar plastic without the ultraviolet agent.

Example 11

This example will show the utility of the esters of the present invention in a solvent-resin system, i.e., spar varnish.

1.0 part of the compound of Example 1 is added to 100 parts of a commercially available spar varnish and mixed to homogeneity. The varnish is applied to a clay-coated paper and dried. Exposure in a fadeometer results in a film which has more gloss than a similar coating without the ultraviolet agent.

*Example 12*

A polyester resin is prepared by coreacting 3 mols of phthalic anhydride, 3 mols of fumaric acid and 6.6 mols of propylene glycol. When esterification is substantially complete, as indicated by an acid number of about 30–40, styrene is added in a sufficient amount to equal ½ of the polyester resin present. 0.02%, based on the total weight, of di-tert. butylhydroquinone is added.

To 200 parts of this resin mixture is added 2 parts of lauryl mercaptan as a 10% solution in styrene, 2 parts of methyl ethyl ketone peroxide and 1 part by weight of the compound of Example 1. This is poured into a suitable mold and cured in an oven by gradually heating to 250° F. and holding for 3 hours.

On exposure in a fadeometer for 300 hours, this sample showed less deterioration and discoloration than a similar sample made excluding the ultraviolet absorber.

We claim:

1. An aliphatic monoester of 2,2',4-trihydroxy-4'-alkoxybenzophenones having the following formula:

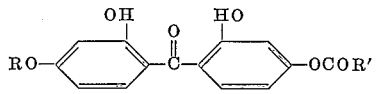

wherein R represents an alkyl radical of from 1 to 4 carbon atoms and R' represents an aliphatic radical of from 10 to 26 carbon atoms.

2. An aliphatic monoester of 2,2',4-trihydroxy-4'-alkoxybenzophenone having the following formula:

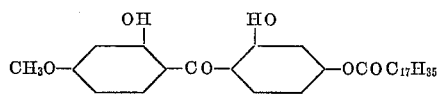

2,2'-dihydroxy-4-stearoyloxy-4'-methoxybenzophenone

3. An aliphatic monoester of 2,2'-4-trihydroxy-4'-alkoxybenzophenone having the following formula:

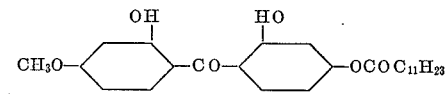

2,2'-dihydroxy-4-lauroyloxy-4'-methoxybenzophenone

4. An aliphatic monoester of 2,2',4-trihydroxy-4'-alkoxybenzophenone having the following formula:

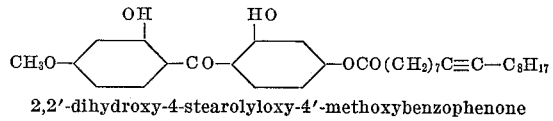

2,2'-dihydroxy-4-stearolyloxy-4'-methoxybenzophenone

5. An aliphatic monoester of 2,2',4-trihydroxy-4'-alkoxybenzophenone having the following formula:

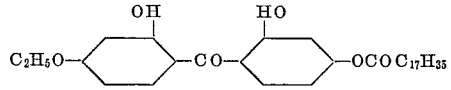

2,2'-dihydroxy-4'-ethoxy-4-stearoyloxybenzophenone

6. An aliphatic monoester of 2,2',4-trihydroxy-4'-alkoxybenzophenone having the following formula:

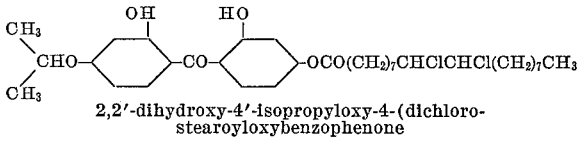

2,2'-dihydroxy-4'-isopropyloxy-4-(dichloro-stearoyloxybenzophenone

References Cited by the Examiner

UNITED STATES PATENTS

| | | | |
|---|---|---|---|
| 2,682,559 | 6/54 | Stanley et al. | 260—45.85 |
| 2,686,812 | 8/54 | Wynn et al. | 260—591 |
| 2,980,647 | 4/61 | Lappin | 260—45.85 |
| 3,017,238 | 1/62 | Levine et al. | 260—31.2 |
| 3,017,383 | 1/62 | Lappin | 260—45.85 |
| 3,080,340 | 3/63 | Havens et al. | 260—45.85 |
| 3,120,564 | 2/64 | Milionis et al. | 260—562 |

CHARLES B. PARKER, *Primary Examiner.*

ALPHONSON D. SULLIVAN, LEON J. BERCOVITZ,
*Examiners.*